United States Patent
Smith

[11] Patent Number: 5,937,361
[45] Date of Patent: Aug. 10, 1999

[54] RADIOTELEPHONES WITH SHIELDED MICROPHONES

[75] Inventor: Stacy Neil Smith, Holly Springs, N.C.

[73] Assignee: Ericsson Inc., Research Triangle Park, N.C.

[21] Appl. No.: 08/853,420

[22] Filed: May 9, 1997

[51] Int. Cl.[6] .................................................. H04Q 7/32
[52] U.S. Cl. ........................... 455/575; 455/90; 455/351
[58] Field of Search ........................... 455/90, 575, 403, 455/550, 424, 425, 501, 63, 351; 381/355, 361, 368, 344

[56] References Cited

U.S. PATENT DOCUMENTS

| | | | |
|---|---|---|---|
| 4,187,481 | 2/1980 | Boutros | 439/89 |
| 5,613,221 | 3/1997 | Hunt | 455/90 X |
| 5,621,363 | 4/1997 | Ogden et al. | 455/90 X |
| 5,682,418 | 10/1997 | Ide | 455/550 |
| 5,732,361 | 3/1998 | Liu | 455/90 X |

*Primary Examiner*—Wellington Chin
*Assistant Examiner*—Yemane Woldetatios
*Attorney, Agent, or Firm*—Myers Bigel Sibley & Sajovec, P.A.

[57] ABSTRACT

Radiotelephones with electrically and acoustically shielded microphones which have a conductive elastomer grommet positioned intermediate of the housing and the printed circuit board is disclosed. The grommet is sized and configured to hold the microphone therein. The grommet provides a continuous shield along the receiving signal path defined by the length of the microphone, any associated signal connector, and the printed circuit board.

28 Claims, 2 Drawing Sheets

RADIOTELEPHONES WITH SHIELDED MICROPHONES

FIELD OF THE INVENTION

The present invention relates to radiotelephones, and more particularly relates to shielding for microphones in radiotelephones.

BACKGROUND OF THE INVENTION

Generally stated, radiotelephones receive and transmit radio-frequency ("RF") radiotelephone signals via incoming and outgoing receive and transmit signal paths. The receive and transmit signal paths typically include components such as microphones and antennas operably associated with a printed circuit board (for signal processing and other functions) disposed in a radiotelephone housing.

Typically, the microphone is positioned in the radiotelephone such that during use it is close to a user's mouth and free to receive the auditory signals associated with a user's speech. Generally described, the microphone receives the auditory signals corresponding to a user's speech and then relays the received auditory signals to the printed circuit board for further processing. The received signal is ultimately directed as an output signal out of the radiotelephone to a remote site. The output signal is typically transmitted out of the radiotelephone through a signal path which includes the antenna.

Many of the more popular hand-held telephones are undergoing miniaturization. Indeed, many of the contemporary models are only 10–12 centimeters in length. Because the printed circuit board is disposed inside the radiotelephone, its size is also shrinking, corresponding to the miniaturization of the portable radiotelephone. As the radiotelephone reduces in size, it constrains the physical configuration or arrangement of the internal components. For example, many integrated components such as the antenna and microphone can be positioned in relatively close proximity of each other. Unfortunately and undesirably, RF energy from the antenna can find its way into the receiving signal path and distort the sound as received in the microphone. Indeed, the distortion is generally frequency dependent and produces an audible (and potentially irritating) sound which is descriptively termed "motorboating".

Generally stated, microphones are difficult to adequately shield due to design constraints such as acoustic isolation, short conductor leads for low signal loss, and an aperture for sound transmission disposed adjacent the aperture in the housing as described above. An electrical connection is made between the microphone and the printed circuit board through flexible means such as wires, elastomeric connectors, and springs. Some of the connections, such as the elastomeric connector, can be sandwiched between the microphone and the printed circuit board to dampen or absorb shocks and help acoustically isolate and thus protect the integrity of the signal at this connection.

In the past, some radiotelephones have metallized the housing front next to the microphone or next to the perimeter of the rubber mounting connector, these have had limited success in attempting to resolve the motorboating condition. Further disadvantageous, metallizing components can be costly. Additionally, capacitors have been used in an attempt to filter the signal distortions due to RF interference. Unfortunately, these attempts have had less than satisfactory results. This is especially true as the operating frequencies of the radiotelephones increase. Indeed, many radiotelephones can operate at frequencies at 800 Mhz and greater, even up to 1.9 GHz. Unfortunately, the signal distortions can increase or become more problematic as the operating frequency increases. Further, many radiotelephones operate in dual band or full duplex; each of which can potentially further exacerbate the problem. For example, the dual band antenna's radiation pattern may produce additional RF energy directed at the microphone.

OBJECTS AND SUMMARY OF THE INVENTION

It is therefore a first object of the present invention to reduce the amount of spurious emission of RF energy introduced into the microphone or acoustic circuit.

It is another object to provide a radiotelephone with a cost effective way to reduce signal distortions attributed to RF signal interference in received signals.

It is yet another object of the present invention to improve the signal quality of the input signal and to reduce the level of "motorboating" in high frequency dual-band radiotelephones.

These and other objects are satisfied by the present invention which provides as a first aspect a signal shielding conductive grommet configured to receive the microphone therein. In particular, the radiotelephone includes a radiotelephone housing which defines a cavity therein. The radiotelephone also includes a microphone disposed in the housing cavity and a printed circuit board disposed within the housing cavity. The printed circuit board is operably associated with the microphone. The radiotelephone also includes a conductive grommet having opposing first and second ends which define a longitudinal passage therebetween. The passage is configured to receive the microphone to provide a shield therefor.

In one embodiment, the housing includes an outer wall with at least one opening formed therein. The radiotelephone also includes a microphone disposed in the housing cavity in alignment with the outer wall opening. A printed circuit board is also disposed within the housing cavity and is operably associated with the microphone. The radiotelephone further includes an electrically conductive grommet which holds the microphone therein and contacts the printed circuit board.

Preferably, the printed circuit board includes ground and signal contacts such that the grommet contacts and forms a continuous connection with at least one of the circuit board ground contacts. Further preferably, the grommet is a conductive elastomer grommet such as a silver filled silicone which is configured to acoustically isolate and electrically shield the microphone. The flexible grommet can provide can absorb mechanical shocks and thereby provide acoustic isolation to the microphone circuit.

As such, the grommet is preferably configured to extend between the printed circuit board and the housing and encloses the microphone therein, thereby providing acoustic isolation and a columnated RF signal shield which extends continuously between the housing and the printed circuit board.

An additional aspect of the present invention is a radiotelephone microphone shield grommet. The grommet preferably comprises a conductive flexible cylindrical body with opposing first and second ends and defining a longitudinal passage therebetween. The grommet is configured to be operably associated with an electrical ground contact. Preferably, the first end includes a circumferentially extending continuous ridge therearound. The radiotelephone microphone shield grommet passage is configured to receive a radiotelephone microphone therein and preferably is sized to contact and firmly hold the microphone to thereby acoustically and electrically shield a radiotelephone microphone from undesired signal distortions.

The foregoing and other objects and aspects of the present invention are explained in detail in the specification set forth below.

DESCRIPTION OF PREFERRED EMBODIMENTS

The present invention will now be described more fully hereinafter with reference to the accompanying figures, in which preferred embodiments of the invention are shown. This invention may, however, be embodied in many different forms and should not be construed as limited to the embodiments set forth herein. Like numbers refer to like elements throughout. The thickness of layers and regions have be exaggerated for clarity.

In the description of the present invention that follows, certain terms are employed to refer to the positional relationship of certain structures relative to other structures. As used herein, the term "longitudinal" and derivatives thereof refer to the general direction defined by the longitudinal axis of the grommet that extends inwardly between opposing front and back sides of the radiotelephone when held in the hand of a user.

Figure 1:
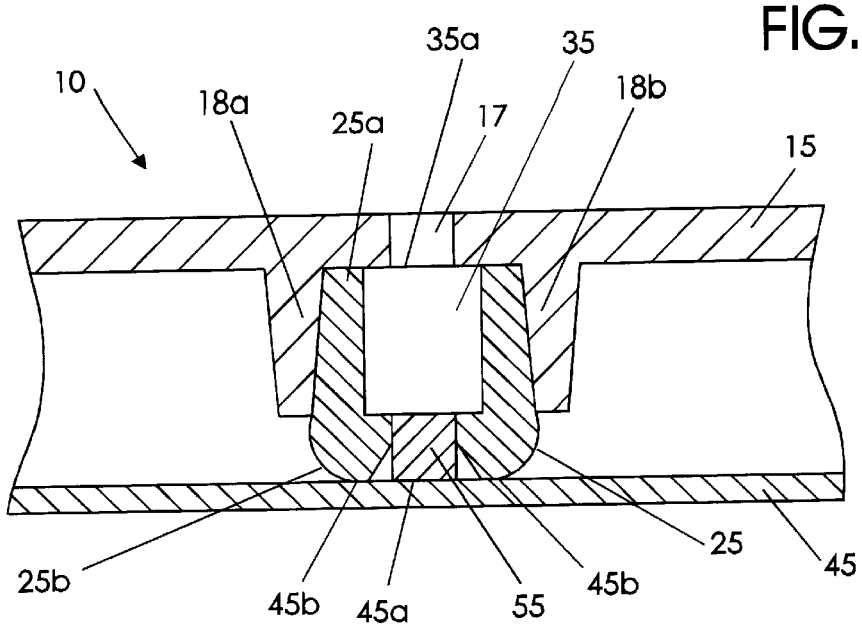
FIG. 1 is a greatly enlarged fragmentary section view of a radiotelephone according to the present invention.

Generally described, the present invention is directed towards the shielding of the radiotelephone input signal path, and in particular to the circuit path between the far end of the microphone, i.e., the end adjacent the housing, and the printed circuit board in the housing. As shown in FIG. 1, the radiotelephone 10 includes a housing 15, a grommet 25, a microphone 35, and a printed circuit board 45. The housing 15 includes at least one opening 17 which is formed therethrough. As is well known in the art, the opening(s)17 is positioned on the housing 15 to be in close communication with a user's mouth during operation. This opening 17 allows the sound waves associated with a user's speech to freely enter the microphone 35.

As illustrated, the housing also includes a pair of opposing and longitudinally extending fingers 18a, 18b. These fingers 18a, 18b help align the grommet 25 and the microphone 35 with the underlying printed circuit board 45. Of course, alternatively configured shapes such as cylindrical extensions, as well as separate brackets or retainers can also be employed to facilitate the alignment of the grommet 25 in the housing.

The microphone 35 includes signal and ground contact portions, typically a central signal contact portion and a circumferentially extending edge ground contact portion (not shown) and is operably associated with the printed circuit board 45. Similarly, the printed circuit board 45 includes a signal contact portion 45a and ground contact portion 45b. As shown, the microphone 35 and the printed circuit board 45 are connected via a connector 55. In a preferred embodiment, as is known to those of skill in the art, the connector is an elastomer connector 55 and includes a series of conductive carbon or gold fibers surrounded by a non-conducting material. The fibers are arranged inward of the outer perimeter so as to allow the connector 55 to conduct the live signal from the microphone along the "Z" axis, that is, along a path which is defined perpendicular to the vertical axis in and out of the paper, i.e, the depth plane. of course, alternative connectors and connection techniques are well known to those of skill in the art. The connector 55 then relays the live signal to the signal contact on the printed circuit board 45a.

Figure 4:
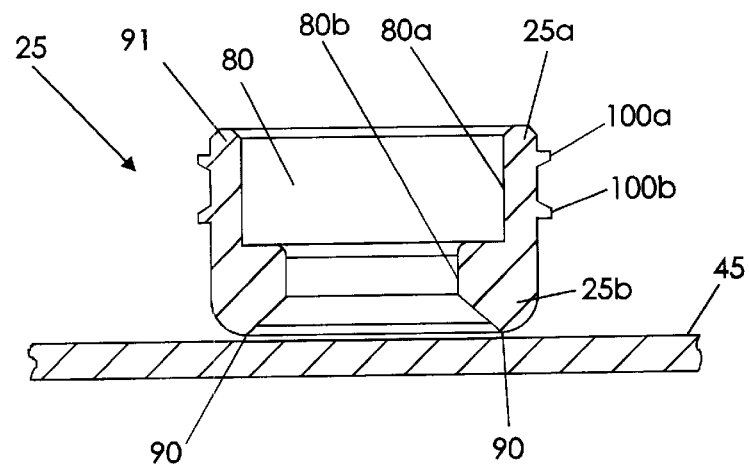
FIG. 4 is a sectional view of the grommet illustrated in FIG. 3.

The grommet 25 is preferably configured to enclose the microphone 35 therein. Further, it is preferred that both ends of the grommet 25a, 25b are configured to be in continuous contact with the respective mating surfaces. For example, in a preferred embodiment, as illustrated in FIG. 4, the printed circuit board end 25b of the grommet preferably includes a circumferentially extending ridge 90. Thus, upon assembly, the ridge 90 can be compressed against the printed circuit board 45 to provide a tight connection therebetween. The ridge 90 is preferably aligned with and connected to mating continuous circumferential ground contact(s) 45b on the printed circuit board 45. This type of contact can facilitate isolation of the input signal and thereby electrically shield the signal path from RF distortion.

Figure 5:
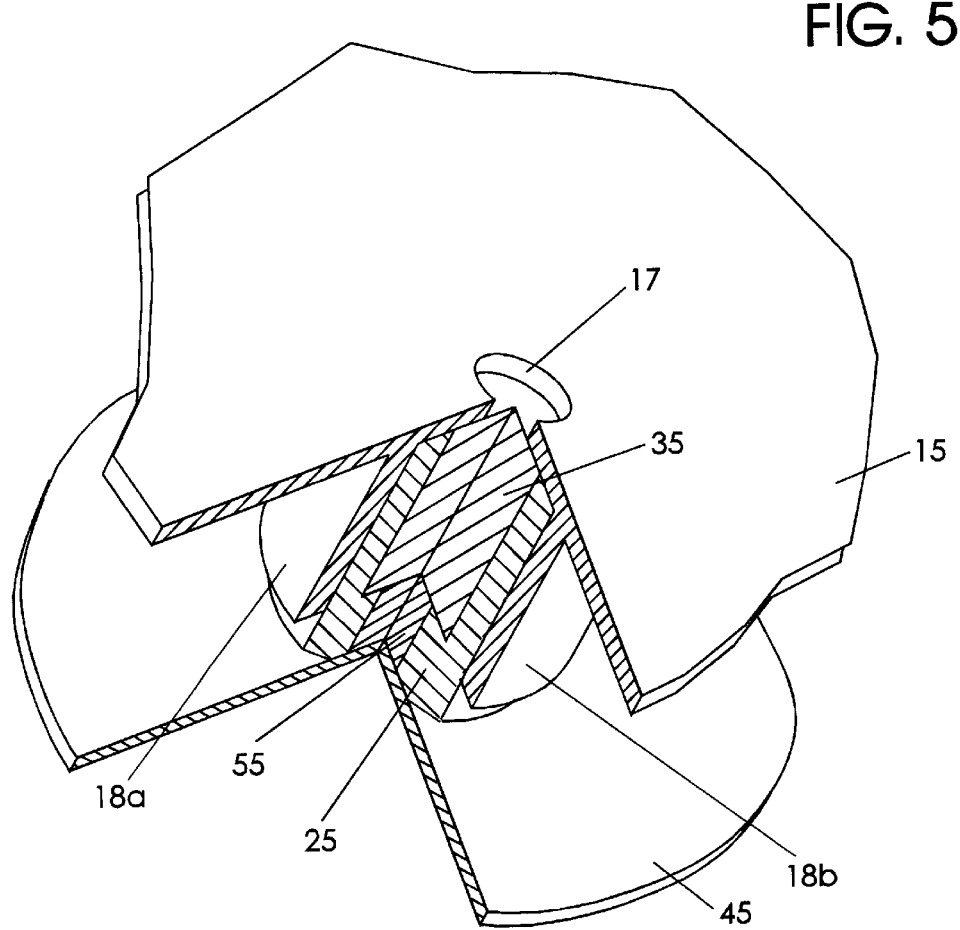
FIG. 5 is a greatly enlarged partial cut away view of a radiotelephone according to the present invention.

As illustrated in FIGS. 1 and 5, the grommet 25 preferably extends the entire distance from the printed circuit board 45 to the housing opening 17. This full length extension provides a columnated shield, i.e., a continuous longitudinally extending shield which extends around the microphone 35 from the printed circuit board 45 to the receiving end of the microphone 35a. Alternatively, the grommet 25 can be sized and configured to be recessed a predetermined distance from the microphone receiving end 35a, be flush with the microphone end 35a, or indeed extend beyond the microphone such that the microphone 35 is recessed therein.

Preferably, the grommet 25 also encloses the connector 55 therein to help prevent errant RF energy from finding its way into the signal path. As described above, the outer perimeter of the elastomer connector is non-conducting such that the signal and ground on the microphone is not short-circuited by contact with the conductive grommet. Advantageously, in this embodiment, the grommet 25 encloses both the connector and microphone in its protective passage 80. It is also preferred that the grommet 25 be sized and configured to tightly hold the microphone 35 against the mating components to prevent shaking or movement of the microphone 35. Further advantageously, this embodiment can reduce acoustic noises or acoustically isolate and protect the input signal path against aberrant sounds or distortions that might be introduced by movement or rattling of components, especially those positioned adjacent the microphone 35, thereby providing a grommet which can electrically shield and acoustically isolate the microphone. Thus, preferably the grommet is flexible and compliant and can advantageously protect the acoustic circuit from potentially damaging mechanical shocks which may be introduced to the radiotelephone.

Figure 2:
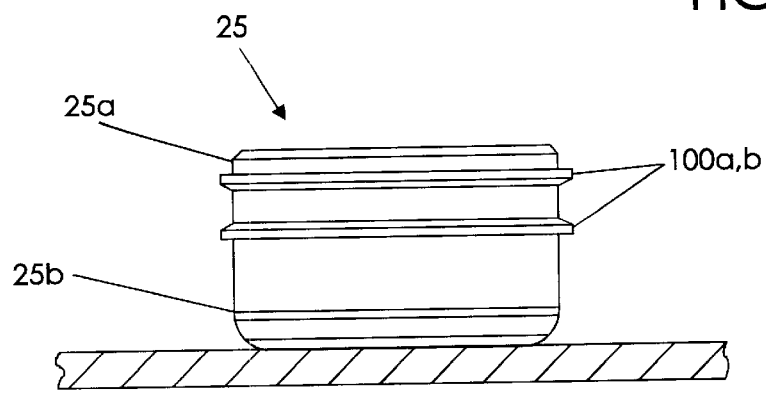
FIG. 2 is a perspective view of a grommet positioned in a radiotelephone housing according to the present invention.
Figure 3:
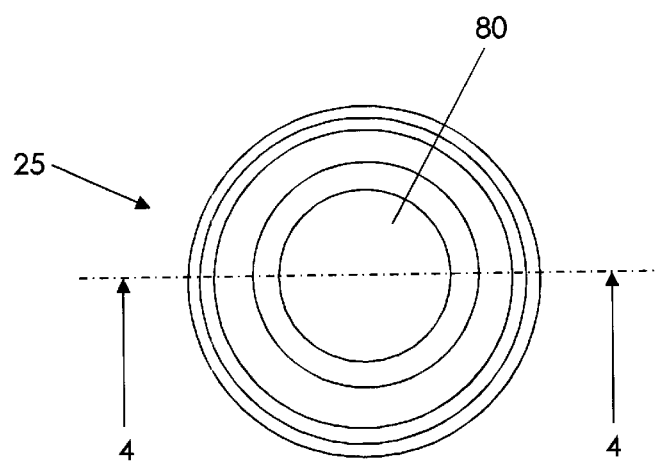
FIG. 3 is an end view of the grommet in FIG. 2.

Turning to FIGS. 2–4, a preferred embodiment of the grommet 25 is illustrated in more detail. Preferably, the grommet 25 is an integrally formed elastomer conductive grommet. A preferred conductive grommet material is a silver filled silicone such as that manufactured by the CHOMERICS Division of PARKER SEALS under formulation number 1310. Examples of additional suitable materials include, but are not limited to, a conductive thermoplastic elastomer from the RTP Company known as RTP 2799 X66439. Alternatively, a nonconductive grommet can be treated such that it includes conductive peripheral surfaces. For example, a silver paint emulsion can be applied over the surfaces of the grommet. The coating will preferably be applied over substantially all externally exposed surfaces of the grommet to form a silver coated elastomer which will electrically shield the microphone circuit as described above. of course, other grommet configurations can be implemented to provide a continuous electrical shield. For example, a continuous, flexible conductive braided sheath can extend between the housing and the printed circuit board around the microphone.

FIG. 4 illustrates a grommet 25 with a longitudinally extending passage 80. The passage 80 includes a first portion 80a and a second portion 80b. The first portion 80a is sized and configured to enclose the microphone 35 while the second portion 80b is sized and configured to enclose the (smaller) connector 55. As such, the first portion of the passage is larger than the second portion of the passage 80a, 80b, respectively. Further preferably, the grommet 25 includes acoustic seals 100. As illustrated, the seals 100a, 100b are protrusions extending perpendicular to the longitudinal axis of the grommet 25. Advantageously, these seals 100a, 100b can provide additional structure so as to facilitate a tight and secure connection from the microphone to the housing to minimize sound leakage therebetween.

As will be appreciated by those of skill in the art, one or more of the above described aspects of the present invention may be provided by alternative hardware components. For example, the microphone can be any acoustic to electrical transducer. Additionally, the microphone housing can include additional discrete components positioned in the microphone housing. Similarly, the term "printed circuit board" is meant to include any microelectronics packaging substrate.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clause are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A radiotelephone, comprising:
    a radiotelephone housing defining a cavity with an upper portion therein, said housing including an outer wall with at least one opening therein;
    a microphone disposed in said housing cavity in alignment with said outer wall opening;
    a printed circuit board disposed within said housing cavity operably associated with said microphone; and
    an electrically conductive grommet having opposing first and second ends and defining a longitudinal axis relative thereto, said grommet including a longitudinally extending passage for holding said microphone therein, wherein said grommet first end is configured to contact said printed circuit board, and wherein said electrically conductive grommet continuously extends between said printed circuit board and said upper portion of said housing cavity.

2. A radiotelephone according to claim 1, wherein said printed circuit board includes ground and signal contacts, and wherein said ground contact is configured as a continuous circumferentially extending ground contact surface, and wherein said grommet forms a continuous connection with said ground contact surface.

3. A radiotelephone according to claim 1, further comprising a connector positioned intermediate of said microphone and said printed circuit board, and wherein said grommet is configured to receive said elastomer connector and said microphone therein, and wherein said grommet is a unitary body.

4. A radiotelephone according to claim 3, wherein said connector is an elastomer connector.

5. A radiotelephone according to claim 1, wherein said grommet is a conductive elastomer grommet configured to acoustically isolate and electrically shield said microphone.

6. A radiotelephone according to claim 5, wherein said conductive elastomer grommet is a silver filled silicone grommet.

7. A radiotelephone according to claim 1, wherein said grommet second end is substantially flush with said microphone.

8. A radiotelephone according to claim 1, wherein said grommet second end contacts said housing adjacent said at least one opening therein.

9. A radiotelephone according to claim 8, said microphone having first and second ends, wherein said second end is recessed a predetermined distance into said grommet.

10. A radiotelephone according to claim 2, wherein said grommet first end includes a circumferentially extending ridge.

11. A radiotelephone, comprising:
    a radiotelephone housing defining a cavity therein, said housing including an outer wall with at least one opening therein;
    a microphone disposed in said housing cavity in alignment with said outer wall opening;
    a printed circuit board disposed within said housing cavity operably associated with said microphone; and
    an electrically conductive grommet having opposing first and second ends and defining a longitudinal axis relative thereto, said grommet including a longitudinally extending passage for holding said microphone therein, wherein said grommet first end is configured to contact said printed circuit board,
    and wherein said grommet is a conductive elastomer grommet configured to acoustically isolate and electrically shield said microphone, and wherein said grommet includes at least one seal extending substantially perpendicular to said longitudinal axis for acoustically dampening forces transmitted about said microphone.

12. A radiotelephone, comprising:
    a radiotelephone housing defining a cavity therein, said housing including an outer wall with at least one opening therein;
    a microphone disposed in said housing cavity in alignment with said outer wall opening;
    a printed circuit board disposed within said housing cavity operably associated with said microphone; and
    an electrically conductive grommet having opposing first and second ends and defining a longitudinal axis relative thereto, said grommet including a longitudinally extending passage for holding said microphone therein, wherein said grommet first end is configured to contact said printed circuit board, wherein said printed circuit board includes ground and signal contacts, and wherein said grommet forms a continuous connection with said ground contact, and wherein said housing includes an inner wall opposite said outer wall and said inner wall includes a pair of longitudinally extending opposing grommet walls and a planar portion therebetween, and wherein said grommet firmly contacts each of said inner walls, said planar portion, and said printed circuit board to define an RF shield therebetween.

13. A radiotelephone microphone shield grommet, said grommet comprising:

a conductive flexible cylindrical body having an outside wall and opposing first and second ends and defining a longitudinal passage therebetween, wherein said grommet is configured to be operably associated with an electrical ground contact, and wherein said grommet includes at least one circumferential radially extending protrusion positioned on said outside wall thereby providing acoustic dampening for said microphone.

14. A radiotelephone microphone shield grommet according to claim 13, wherein said first end includes a circumferentially extending continuous ridge therearound.

15. A radiotelephone microphone shield grommet according to claim 13, wherein said passage is configured to receive a radiotelephone microphone therein.

16. A radiotelephone microphone shield grommet according to claim 15, wherein said passage is sized to contact and firmly hold the microphone therein thereby acoustically isolating and electrically shielding the microphone from undesired signal distortions.

17. A radiotelephone microphone shield grommet, said grommet comprising:

a conductive flexible cylindrical body having opposing first and second ends and defining a longitudinal passage therebetween, wherein said grommet is configured to be operably associated with an electrical ground contact, wherein said passage is configured to receive a radiotelephone microphone therein, and wherein said passage is sized to contact and firmly hold the microphone therein thereby acoustically isolating and electrically shielding the microphone from undesired signal distortions, and wherein said passage includes first and second portions, said second portion having a smaller diameter than said first portion, said second portion is configured adjacent said first end of said grommet, and wherein said first portion is sized to receive the microphone in abutting contact therein, said second portion is sized and configured to enclose a microphone connector therein.

18. A radiotelephone microphone shield assembly for acoustically isolating and electrically shielding the microphone in a radiotelephone, comprising;

a radiotelephone housing having an aperture disposed therein;

a microphone having opposing first and second ends disposed in said housing such that said first end is in communication with said aperture;

a printed circuit board disposed in said housing and operably associated with said microphone;

an elastomer connector disposed between said microphone and said printed circuit board to provide a signal path therebetween; and a conductive grommet positioned in said housing intermediate of said housing aperture and said printed circuit board, said grommet having opposing first and second ends and a passage defined therebetween, said passage configured to receive said microphone and said elastomer connector therein, wherein said grommet is sized such that said first end contacts said housing adjacent said aperture and said opposing second end extends to firmly contact said printed circuit board, the assembly providing a columnated shield along said microphone.

19. An assembly according to claim 18, wherein said columnated shield is continuous about the length of said microphone.

20. An assembly according to claim 18, said microphone having first and second opposing ends and a longitudinally extending body therebetween, wherein said first end is free to communicate with said aperture, and said second end includes a central signal portion in contact with said elastomer connector, and wherein said longitudinally extending body is fully enclosed within said grommet.

21. An assembly according to claim 20, wherein said grommet extends from the printed circuit board to the top of said microphone, such that the microphone first end is substantially flush with said grommet first end.

22. An assembly according to claim 20, wherein said grommet is a silver filled silicon grommet.

23. A radiotelephone, comprising:

a radiotelephone housing defining a cavity therein;

a microphone disposed in said housing cavity;

a printed circuit board disposed within said housing cavity operably associated with said microphone; and a conductive grommet having opposing first and second ends defining a longitudinal passage therebetween, said passage configured to receive said microphone to provide a shield therefor.

24. A radiotelephone according to claim 23, wherein said printed circuit board includes ground and signal contacts, and wherein said grommet forms a continuous connection with at least one of said ground contacts.

25. A radiotelephone according to claim 23, said radiotelephone further comprising an elastomer holder positioned intermediate of said microphone and said printed circuit board, and wherein said grommet is configured to receive said elastomer holder and said microphone therein.

26. A radiotelephone according to claim 23, wherein said grommet is a conductive elastomer grommet configured to acoustically isolate and electrically shield said microphone.

27. A radiotelephone according to claim 26, wherein said conductive elastomer grommet is a silver filled silicone grommet.

28. A radiotelephone, comprising:

a radiotelephone housing defining a cavity therein;

a microphone disposed in said housing cavity;

a printed circuit board disposed within said housing cavity operably associated with said microphone; and a conductive elastomer grommet having opposing first and second ends defining a longitudinal passage therebetween, said passage configured to receive said microphone to acoustically isolate and electrically shield said microphone, wherein said conductive elastomer grommet is a silver filled silicone grommet, and wherein said grommet includes at least one seal extending substantially perpendicular to said longitudinal passage for acoustically dampening forces transmitted about said microphone.

* * * * *